Patented May 23, 1933

1,910,318

UNITED STATES PATENT OFFICE

WILLIAM HANSON BOORNE, OF CARSHALTON, ENGLAND

PRODUCTION OF A MOLDING POWDER

No Drawing. Application filed February 21, 1931, Serial No. 517,638, and in Great Britain March 10, 1930. Renewed October 7, 1932.

This invention has for its object the production of an improved molding powder capable of being molded by hot pressing or rolling into a variety of articles.

Molding powders having as a basis resinates such as obtained by reaction between rosin and formaldehyde in the presence of lime and admixed with a filler possess only limited "flowing" power during hot pressing, and are of utility only for the production of solid articles of simple form, such as slabs, tiles, balls, dishes, knobs and the like suitable for building, decorating and like purposes. Such molding powders are also too soft to take a high polish or natural finish in the mold.

It would seem that in practice the acid resin is never completely neutralized by its fusion with lime, but that there is formed a mixture of resinates retaining in part the original plasticity of the resin, irrespective of the quantity of lime used. Though reaction of the lime with the resin may be promoted by the employment of catalysts, the extra hardening due thereto is inadequate; further, the employment of suitable catalysts adds to the cost of production.

As the result of experimental research I have now found that an inexpensive but effective "flowing" molding powder giving hard products can be produced by adding to the resinous compound resulting from the reaction of rosin and formaldehyde in the presence of lime small quantities of certain inexpensive hardeners and lubricants, rendering practicable the production at very low cost of a thermo-molding powder having the necessary fluidity and hardness to permit its use in hot-pressing molds of even complicated form.

As a hardening agent I use a small quantity, not exceeding five per cent of the weight of the resinate, of the double silicate and aluminate of calcium obtainable in commercial form as Portland cement, and in cases where even greater hardness and brilliance of surface are required a small proportion, not exceeding eight per cent, of hexamethylenetetramine.

To facilitate the rapid and clean ejection of the molded articles from the molds I incorporate in the powder a small quantity of heavy petroleum oil, in a proportion not exceeding two and one-half per cent of the mass, such oil having been previously mixed into a stiffish paste with calcium carbonate.

Whereas the addition of free oil to the molding powder is apt to cause "spottiness" in the mold and bad markings on the surface of the moldings which cannot be removed or polished away, the compounding of the oil with the calcium carbonate to form a paste before adding to it the other ingredients ensures against this drawback.

An example of the proportions (by weight) which I use is as follows:—

4 parts of common rosin (colophony) ground to a fine powder, 1 part of freshly slaked lime, powdered, and 4 parts of 40% formalin, mixed and heated in an open vessel.

Of this composition dried and ground to powder I take 450 parts by weight and mix therewith, say 400 parts of a cellulose filler (or waste) such as wood-flour, sawdust or waste paper, 4 parts of Portland cement, and 10 parts of heavy mineral oil which has been mixed to a paste with, say, 5 parts of calcium carbonate.

This powder will dye well, and is moldable at a moderate temperature with a pleasing brilliance and hardness of surface.

The rosin may be compounded with synthetic phenol resins.

I claim:—

1. The process of producing a molding powder consisting in mixing rosin, lime and formalin, drying the mixture obtained, grinding the dried mixture to powder and adding to the powder a filler, Portland cement and petroleum oil admixed with calcium carbonate.

2. The process of producing a molding powder consisting in mixing rosin, lime and formalin, drying the mixture obtained, grinding the dried mixture to powder and adding to the powder a cellulose filler, Portland cement, hexamethylenetetramine and petroleum oil admixed with calcium carbonate.

3. A molding powder consisting of the product of reaction of rosin, formaldehyde and lime, admixed with a filler, Portland cement and petroleum oil admixed with calcium carbonate.

In testimony whereof I have signed my name to this specification.

WILLIAM HANSON BOORNE.